United States Patent
Slunick et al.

(10) Patent No.: US 7,758,086 B2
(45) Date of Patent: Jul. 20, 2010

(54) METAL TO PLASTIC FLUID CONNECTION WITH OVERMOLDED ANTI-ROTATION RETAINER

(75) Inventors: Steven Thomas Slunick, Clarkston, MI (US); Norman F. Kane, Holly, MI (US)

(73) Assignee: Cooper-Standard Automotive Inc., Novi, MI (US)

( * ) Notice: Subject to any disclaimer, the term of this patent is extended or adjusted under 35 U.S.C. 154(b) by 0 days.

(21) Appl. No.: 10/559,621

(22) PCT Filed: Aug. 18, 2004

(86) PCT No.: PCT/US2004/026852

§ 371 (c)(1),
(2), (4) Date: Dec. 6, 2005

(87) PCT Pub. No.: WO2005/022022

PCT Pub. Date: Mar. 10, 2005

(65) Prior Publication Data

US 2006/0152003 A1    Jul. 13, 2006

Related U.S. Application Data

(60) Provisional application No. 60/497,199, filed on Aug. 21, 2003.

(51) Int. Cl.
*F16L 5/00* (2006.01)
(52) U.S. Cl. ............... 285/334.5; 285/286.2; 285/347; 285/351; 285/364; 285/374
(58) Field of Classification Search ......... 285/294.1, 285/334.5, 347, 351, 364, 369, 382, 406, 285/89, 281–282, 286.1, 286.2, 374, 403, 285/332.3, 913–914, 82; 29/505, 508, 521, 29/890.03, 890.035, 890.052, 890.09, 890.14, 29/890.141; 264/263
See application file for complete search history.

(56) References Cited

U.S. PATENT DOCUMENTS

| | | | | | |
|---|---|---|---|---|---|
| 593,190 | A | * | 11/1897 | Bernhardt | 285/317 |
| 1,853,411 | A | * | 4/1932 | Gentry et al. | 285/342 |
| 1,936,552 | A | * | 11/1933 | Goss | 285/354 |
| 2,195,492 | A | * | 4/1940 | McDonald | 285/330 |
| 2,738,993 | A | | 1/1953 | Wilson | |
| 2,833,568 | A | * | 5/1958 | Corsette | 285/281 |
| 3,533,649 | A | * | 10/1970 | Williams | 285/148.13 |
| 3,747,960 | A | * | 7/1973 | Bawa | 285/39 |
| 3,971,614 | A | * | 7/1976 | Paoli et al. | 439/321 |
| 4,089,453 | A | | 5/1978 | Jenkins | |
| 4,402,773 | A | * | 9/1983 | Morrill | 285/25 |
| 4,635,972 | A | | 1/1987 | Lyall | |

(Continued)

FOREIGN PATENT DOCUMENTS

DE    88 10 285    10/1988

(Continued)

*Primary Examiner*—Aaron M Dunwoody
*Assistant Examiner*—Fannie Kee
(74) *Attorney, Agent, or Firm*—Carlson, Gaskey & Olds

(57) ABSTRACT

A fluid connection assembly (10) includes a metal tube (22) having a flared end and a plastic manifold (12) having a port (14). The port (14) includes an annular collar (16) and an annular recess (18) that receives a seal (20). The metal tube (22) is arranged over the port (14) and engages the seal (20). The flared end of the metal tube (22) abuts the annular collar (16) of the port (14) when the metal tube (22) is installed. A plastic retainer (28) is molded over the annular collar (16) of the port (14) and the flared end of the metal tube (22) to retain the metal tube (22) axially on the port (14) of the manifold (12).

10 Claims, 2 Drawing Sheets

U.S. PATENT DOCUMENTS

| | | | | |
|---|---|---|---|---|
| 4,832,381 | A * | 5/1989 | Boulton | 277/621 |
| 4,884,829 | A * | 12/1989 | Funk et al. | 285/24 |
| 5,002,314 | A * | 3/1991 | Smith | 285/12 |
| 5,048,875 | A * | 9/1991 | Usui et al. | 285/319 |
| 5,105,787 | A | 4/1992 | Imoehl | |
| 5,364,131 | A * | 11/1994 | Hartsock et al. | 285/23 |
| 5,509,699 | A | 4/1996 | Himmelberger | |
| 5,568,949 | A | 10/1996 | Andre | |
| 5,816,626 | A * | 10/1998 | Anderson et al. | 285/318 |
| 5,826,920 | A * | 10/1998 | Bartholomew | 285/305 |
| 5,868,435 | A | 2/1999 | Bartholomew | |
| 5,965,077 | A | 10/1999 | Rowley et al. | |
| 6,082,780 | A | 7/2000 | Rowley et al. | |
| 6,231,085 | B1 | 5/2001 | Olson | |
| 6,412,827 | B1 * | 7/2002 | Barclay et al. | 285/312 |
| 6,497,836 | B2 | 12/2002 | Krause et al. | |
| 6,722,708 | B2 | 4/2004 | Morohoshi et al. | |
| 2004/0075277 | A1 | 4/2004 | Patel et al. | |
| 2005/0082829 | A1 * | 4/2005 | Dallas | 285/354 |

FOREIGN PATENT DOCUMENTS

| | | |
|---|---|---|
| DE | 91 03 511 | 6/1991 |
| GB | 633 351 | 12/1949 |
| WO | WO 00/77440 | 12/2000 |

* cited by examiner

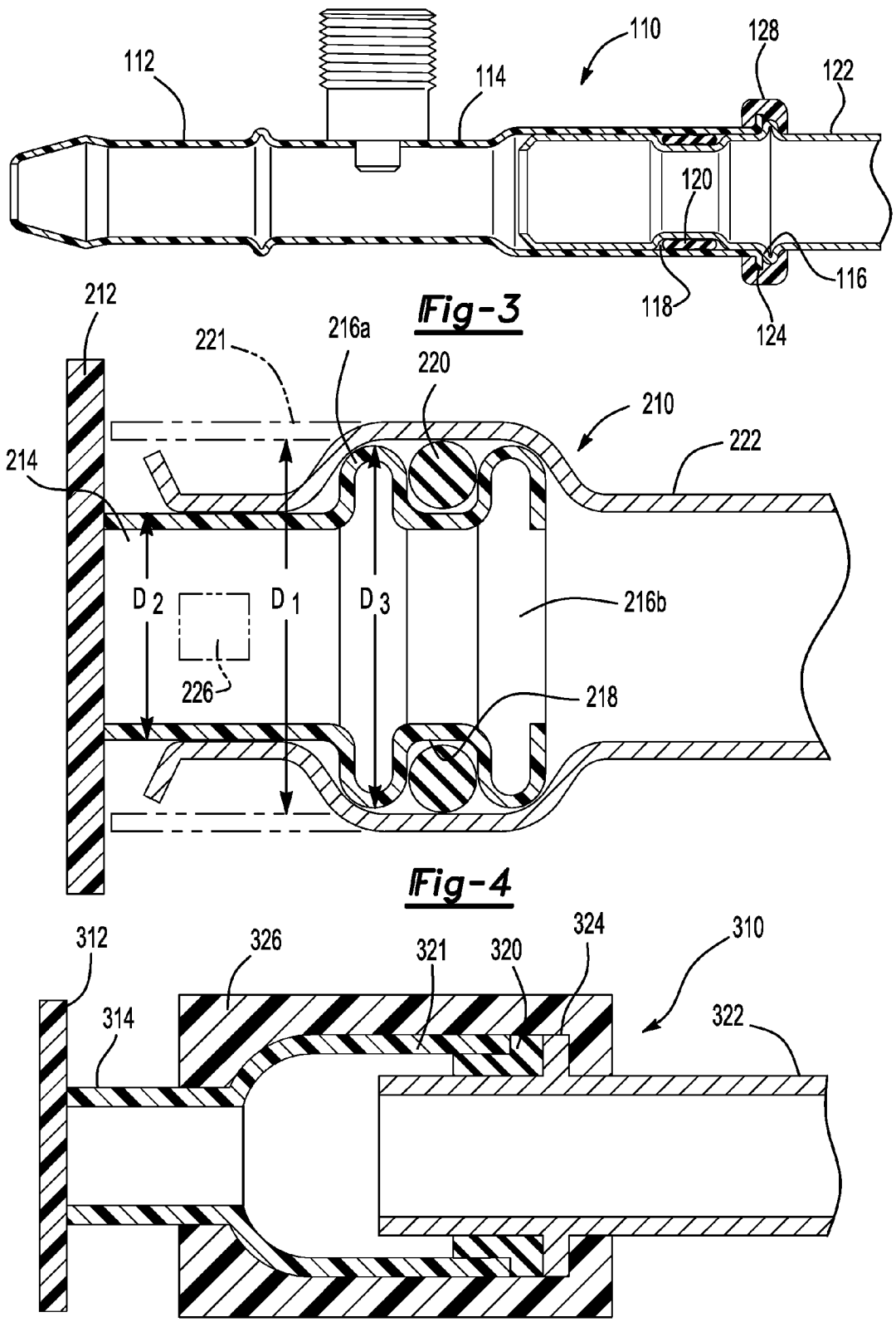

METAL TO PLASTIC FLUID CONNECTION WITH OVERMOLDED ANTI-ROTATION RETAINER

REFERENCE TO RELATED APPLICATIONS

This application is a National Stage Application of PCT Application PCT/US04/026852 filed on Aug. 18, 2004, which claims priority to U.S. Provisional Application No. 60/497,199 filed Aug. 21, 2003.

BACKGROUND OF THE INVENTION

The present invention relates generally to a fluid connection assembly including a metal tube and a plastic housing secured together by a retainer and a method of making the fluid connection assembly.

Numerous fluid connections are used in the art. One type of fluid connection secures a metal tube to a fluid housing. In some applications, the fluid housing is a metal block referred to as a braze block. The metal tube is secured to the fluid housing by brazing. It is advantageous to secure the metal tube to the fluid housing so that the metal tube is in the desired position relative to the fluid housing during shipping and installation. However, there are several drawbacks to brazing. For one, brazing is expensive and relatively difficult to control. Additionally, if a non-uniform braze bead is formed, leaks may occur between the metal tube and the fluid housing. Moreover, the braze block is relatively heavy.

Therefore, there is a need for a fluid connection assembly that provides an improved fluid connection that connects dissimilar materials, reduces the cost of the prior art assembly, reduces the potential for leaks, and overcomes the drawbacks and the shortcomings of the prior art.

SUMMARY OF THE INVENTION

A fluid connection assembly includes a metal tube having a flared end and a plastic manifold having a port. The port includes an annular collar and an annular recess that receives a seal. The metal tube is arranged over the port and engages the seal. When the metal tube is arranged over the port, the flared end abuts the annular collar of the port. Once the metal tube is installed on the port of the manifold, a plastic retainer is molded over the annular collar of the port and the flared end of the metal tube to retain the metal tube axially on the port of the manifold. The material of the retainer enters a locating feature on the port and the metal tube to prevent rotation of the metal tube relative to the manifold.

Alternately, the port includes a flared end and the metal tube includes an annular collar. The metal tube is inserted into the port, and the annular collar of the metal tube engages the flared end of the port to prevent over insertion of the metal tube into the port. A seal is received in a recess in the metal tube. When the metal tube is inserted into the port, the seal is located between the metal tube and the port. A retainer is molded over the annular collar of the metal tube and the flared end of the port to retain the metal tube axially on the port of the manifold.

In another embodiment, the metal tube is positioned over the port and the end is crimped to secure the metal tube to the port of the manifold.

In another embodiment, the port of the manifold includes a flared end. A metal tube is inserted into the flared end of the port, compressing a seal between the port and the metal tube. A retainer is over-molded over the joint of the port and the metal tube, compressing the seal and retaining the components together.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows:

FIG. 3 illustrates a cross-sectional view of a second embodiment of the fluid connection assembly of the present invention;

FIG. 4 illustrates a cross-sectional view of a third embodiment of the fluid connection assembly of the present invention; and FIG. 5 illustrates a cross-sectional view of a fourth embodiment of the fluid connection assembly of the present invention.

DETAILED DESCRIPTION OF THE PREFERRED EMBODIMENT

Figure 1:
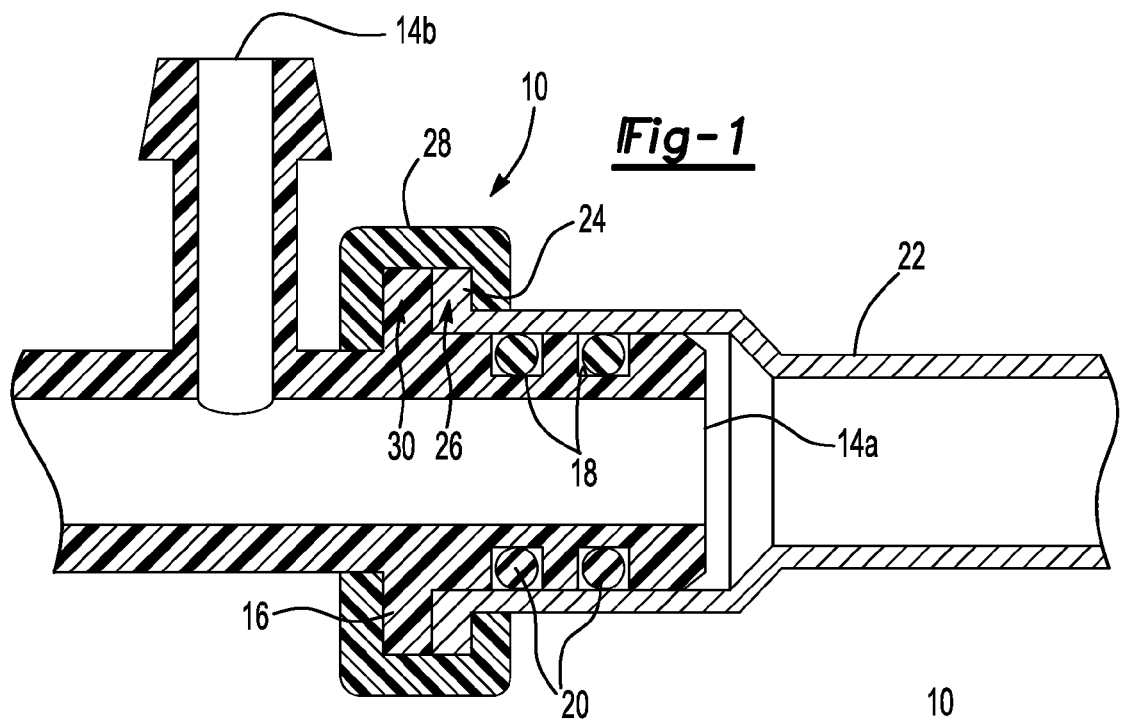
FIG. 1 illustrates a cross-sectional view of the fluid connection assembly of the present invention.
Figure 2:
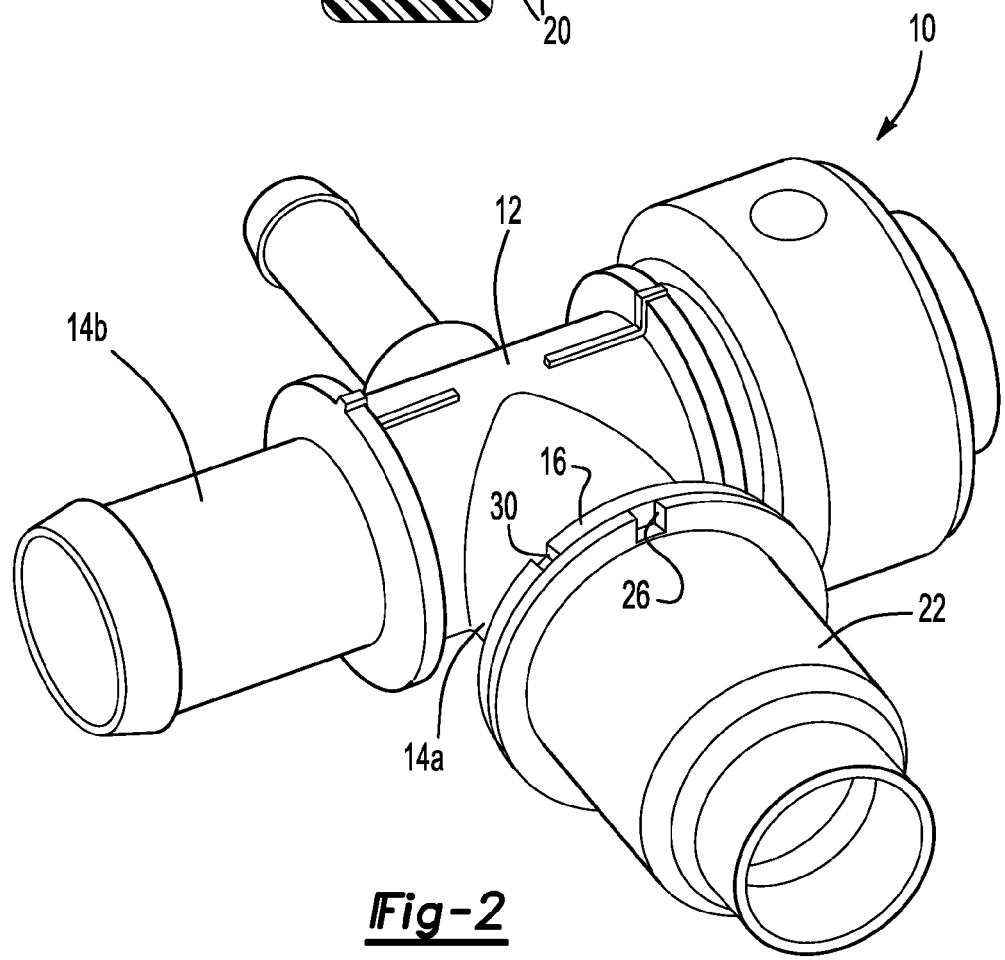
FIG. 2 illustrates a perspective view of the fluid connection assembly with a tube installed onto a port of a manifold.

FIGS. 1 and 2 illustrate a fluid connection assembly 10 including a housing having one or more ports 14a and 14b. In one embodiment, the housing is a manifold 12. The manifold 12 may be constructed from any suitable lightweight material, but preferably the manifold 12 is constructed from plastic to reduce the weight of the fluid connection assembly 10. In one example, the manifold 12 is made of nylon. As will be appreciated from the description below, a metal block is not necessary because the brazing operation of the prior art is eliminated.

The fluid connection assembly 10 can be utilized in any fluid conveying system through which fluid travels, including vapor or liquid. The fluid connection assembly 10 can be used in a water heater system, an air conditioning system, or a hydraulic system. Although these examples are described, it is to be understood that the fluid connection assembly 10 can be used in any fluid conveying system.

The port 14a includes an annular collar 16 that acts as a stop. The port 14a also includes one or more annular recesses 18 that are spaced from the annular collar 16. Each annular recess 18 receives a seal 20, such as a rubber O-ring, that provides a leak proof assembly. A metal tube 22 is arranged over the port 14a and engages the seals 20. The metal tube 22 includes a flared end 24 that abuts the annular collar 16 when the metal tube 22 is fully installed. The metal tube 22 can be aluminum or steel. However, the tube 22 can be made of other materials, and one skilled in the art would know what materials to employ. The present invention enables the plastic manifold 12 and the metal tube 22, which are made of dissimilar materials, to be joined by forming a leak proof fluid connection.

The port 14a and the metal tube 22 each include a locating feature 30 and 26, respectively, as will be better appreciated from the description below. Preferably, the annular collar 16 of the port 14a and the flared end 24 of the metal tube 22 both include the locating feature 30 and 26, respectively. Preferably, the locating features 26 and 30 are notches.

When the metal tube 22 is installed on the port 14a of the manifold 12, a retainer 28 is molded over the annular collar 16 of the port 14a and the flared end 24 of the metal tube 22 to retain the metal tube 22 axially on the port 14a. In one example, the retainer 28 is plastic. Preferably, the retainer 28 is injection molded. A mold is positioned over the joint of the metal tube 22 and the port 14a of the manifold 12. The melted material of the retainer 28 enters the mold and flows into the locating features 26 and 30. After the melted material cools, the mold is removed, providing the retainer 28. The retainer 28 rotationally locks the metal tube 22 to the port 14a of the manifold 12 and prevents relative rotation between the metal tube 22 and the port 14a.

Alternately, as shown in FIG. 3, a fluid connection assembly 110 including a metal tube 122 is inserted into a port 114 of a manifold 112. The port 114 includes a flared end 124, and the metal tube 122 includes an annular collar 116. When the metal tube 122 is inserted into the port 114, the flared end 124 of the port 114 engages the annular collar 116 of the metal tube 122 to prevent over insertion of the metal tube 122 into the port 114. The metal tube 122 includes a recess 118 spaced from the annular collar 116, and a seal 120 is received in the recess 118. When the metal tube 122 is inserted into the port 114 of the manifold 112, the seal 120 is located between the metal tube 122 and the port 114. A retainer 128 is molded over the annular collar 116 of the metal tube 122 and the flared end 124 of the port 114 to retain the metal tube 122 axially on the port 114. Although not illustrated, the metal tube 122 and the port 114 of the manifold 112 each include locating features to prevent relative rotation of the metal tube 122 relative to the port 114.

FIG. 4 illustrates a third embodiment of a fluid connection assembly 210 including a manifold 212 having port 214. The port 214 includes two annular collars 216a and 216b and an annular recess 218 located between the two annular collars 216a and 216b. Each of the two annular collars 216a and 216b has an outer diameter D3. The annular recess 218 receives a seal 220. In one example, the seal 220 is a rubber O-ring. A metal tube 222 is arranged over the port 214 and engages the seal 220. The port 214 and/or the metal tube 222 can also include a locating feature 226 that positions the metal tube 222 relative to the port 114 of the manifold 212.

When the metal tube 222 is installed, the end 221 of the metal tube 222 is arranged over the port 214, as shown by the dotted line. The end 221 has an inner diameter D1. The inner diameter D1 of the end 221 of the metal tube 222 is slightly greater than the outer diameter D3 of the two annular collars 216a and 216b. The end 221 of the metal tube 222 is then crimped to secure the end 221 of the metal tube 222 on the port 214 of the manifold 212, as shown by the solid line. When crimped, the end 221 of the metal tube 222 has an inner diameter D2, which is less than the inner diameter D1. The end 221 of the metal tube 222 can be crimped by an 8 jaw. However, other tools can be used to crimp the end 221 of the metal tube 222, and one skilled in the art would know how to crimp the end 221 of the metal tube 222.

FIG. 5 illustrates a fourth embodiment of a fluid connection assembly 310 including a manifold 312 having port 314. The port 314 includes a flared end 321. A metal tube 322 is inserted into the port 314, compressing a seal 320 between the flared end 321 of the port 314 and the metal tube 322. A retainer 326 is over-molded over the joint of the port 314 of the manifold 312 and the metal tube 322. The metal tube 322 includes a flared end 324 that abuts the seal 320 when the metal tube 322 is fully installed. The retainer 326 compresses the seal 320 and retains the components together. Alternately, the metal tube 322 includes the flared end 324 and the port 314 is inserted into the metal tube 322.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

The invention claimed is:

1. A method of assembling a fluid connection comprising the steps of:
   attaching a fluid port of a plastic housing to a metal tube, wherein the fluid port and the tube are coaxial along a longitudinal axis defined by the fluid port;
   locating a seal between the metal tube and the fluid port;
   forming a first notch in the fluid port and a second notch in the metal tube;
   retaining the fluid port to the metal tube; and
   preventing rotation between the fluid port of the plastic housing and the metal tube about the longitudinal axis by flowing a material into the first notch and the second notch during the step of retaining the fluid port to the metal tube.

2. The method as recited in claim 1 further including the step of inserting the fluid port into the metal tube.

3. The method as recited in claim 2 further including the step of preventing over insertion of the metal tube during the step of inserting the fluid port into the metal tube.

4. The method as recited in claim 1 wherein the step of retaining includes molding a plastic retainer over a joint of the metal tube and the fluid housing.

5. The method as recited in claim 1 wherein the metal is aluminum.

6. The method as recited in claim 1 wherein the material flowed into the first notch and the second notch is plastic.

7. The method as recited in claim 1 wherein the step of inserting the fluid port into the metal tube is performed such that an annular collar of the fluid port abuts a flared end of the metal tube.

8. The method as recited in claim 7 wherein the step of retaining the fluid port to the metal tube includes molding a retainer over the annular collar of the fluid port and the flared end of the tube.

9. The method as recited in claim 1 wherein the step of locating a seal between the metal tube and the fluid port includes the step of receiving the seal into at least one annular recess of the fluid port.

10. The assembly as recited in claim 1, wherein the first notch extends along a portion of a circumference of the fluid port, the fluid port circumference portion being less than the entire circumference of the fluid port, and wherein the second notch extends along a portion of a circumference of the metal tube, the metal tube circumference portion being less than the entire circumference of the metal tube.

* * * * *